United States Patent
Kawecki et al.

(10) Patent No.: US 6,298,126 B1
(45) Date of Patent: Oct. 2, 2001

(54) METHOD AND APPARATUS FOR CONTROLLING RATING OF CALLS TO PAY SERVICES

(75) Inventors: Michael Anthony Kawecki, South Bound Brook; Michael Anthony Scott, Matawan, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/991,399

(22) Filed: Dec. 16, 1997

(51) Int. Cl.$^7$ ................................................. H04M 15/00
(52) U.S. Cl. ........................ 379/126; 379/221; 379/121; 379/114; 379/223; 379/128
(58) Field of Search .................................. 379/112, 114, 379/115, 121, 126, 127, 220, 221, 223–230, 145, 91.01, 119, 124, 128

(56) References Cited

U.S. PATENT DOCUMENTS

| | | | |
|---|---|---|---|
| 4,538,030 | * 8/1985 | Fossett et al. | 379/114 |
| 5,003,584 | * 3/1991 | Benyacar et al. | 379/119 |
| 5,148,474 | * 9/1992 | Haralambopoulos et al. | 379/114 |
| 5,187,710 | * 2/1993 | Chau et al. | 379/114 |
| 5,515,425 | * 5/1996 | Penzias et al. | 379/114 |
| 5,568,541 | * 10/1996 | Greene | 379/114 |
| 5,781,620 | * 7/1998 | Montgomery et al. | 379/114 |
| 5,875,236 | * 2/1999 | Jankowitz et al. | 379/114 |
| 5,905,736 | 5/1999 | Ronen et al. . | |
| 5,963,625 | * 10/1999 | Kawecki et al. | 379/114 |

* cited by examiner

*Primary Examiner*—Duc Nguyen
*Assistant Examiner*—Rexford Barnie

(57) ABSTRACT

A telecommunications toll network system employs a central database computer to provide routing and calling rate instructions to toll switches. To allow sponsors of pay services, such as 900 number information services, to control the kinds of calls they receive and the rates charged, the central database computer employs routing plans. These routing plans contain conditional branches which are selected based on data provided in a query from the originating toll switch (OTS) and sent to the database computer via common channel signaling (CCS). According to the invention, sponsors can insert objects in their routing plans to override the default rate to be applied to the call. These objects are called rate nodes. Rate nodes are non-branching elements inserted in a routing plan that specify a rate to be used for billing. The rate is specified on the automated message accounting (AMA) record and used by a billing platform to generate bills to the callers. Since the routes and rating are determined by a program in response to a single query from the OTS, the call is handled quickly. Additionally, smaller service providers without the ability to set up communications between their own facility (which might be simply a plain old telephone system; POTS) are able to make use of the control features provided.

18 Claims, 5 Drawing Sheets

METHOD AND APPARATUS FOR CONTROLLING RATING OF CALLS TO PAY SERVICES

TECHNICAL FIELD

The invention relates generally to the field of pay telecommunications services including, for example, pay-per-product and pay-for-information services provided through 1-900 calling and, more particularly, to a method for routing calls to pay service providers.

BACKGROUND OF THE INVENTION

Pay telephone services allow customers to access different services over a telecommunications network and to pay for the services through the networks billing scheme. For example, one such service might be the provision of lottery information. A telecommunications network contains a database of information about customers, customer area codes, and other data to control routing of calls and billing of customers. Through pay telephone services, a caller can be billed a premium price for calls, typically to a 900 number, by the toll network company in a way that is similar to the way the toll network bills its customers for ordinary calls. The main difference, aside from the price of the call, is that the service provider usually receives payment through the toll network company which bills the customer through its own billing process. Service providers can also receive payment for services directly such as, for example, by credit card, through a special credit account, or by billing the customer directly.

Pay services may include pay per product services such as home shopping or catalog services and pay for information services such as government services, banking and financial services, customer services, news services, polling and surveys, fund raising, marketing and promotion opportunities, dating services, health care information services, sports score services, weather services, etc. Typically a caller dials a 1-900 telephone number and is connected through the toll network to a service bureau which connects the caller to voice machines or human beings to interact with the caller. The pay-per-product call is typically free to the caller (but its cost is accounted for in the cost of the product to the consumer).

The price charged for a call can be a fixed rate per call or a fixed rate per minute of connect time. Other combinations are possible, for example, there may be a grace period during which the caller can hang up without incurring any charge. The call may run one rate for the first N incremental time periods (e.g. minutes) and another rate for each increment of time thereafter. A single call for an expensive service, for example medical advice, might be a hundred dollars or more.

Revenue losses suffered by pay service providers from such pay calls can be substantial when customers do not pay. Automatic number identification has helped to identify callers known that present a high risk of fraud. This information can be used in advance of a call. Automatic number identification provides the telephone number of the calling party (or the NPA of the originating LEC). Through a credit look-up process, the toll network provider may determine the caller's credit history, at least with respect to their toll service bill. In other words, the toll network company may verify, by looking up the calling number, callers with bad credit history. A call from a customer that is a bad credit risk can then be blocked by simply not connecting the call.

In the prior art, it is known to block calls where a bad credit card number (invalid number or bad credit history) is entered by a caller (U.S. Pat. No. 4,756,020 to Fodale) Also known is call-blocking where the ANI delivered by the local exchange carrier (LEC) is correlated with a bad credit history. Such capability is provided by Lucent Technologies' #4 Electronic Switching System (#4ESS) in communication with a database computer called a network control processor (NCP). This system also provides call-blocking in the event of a bad credit card number. A call-blocking system described in a patent to Friedes (U.S. Pat. No. 5,311,572) prompts a caller for additional information if the ANI information is insufficient to verify the identity of the caller. Another calling system that is responsive to credit information about a customer is described in U.S. Pat. No. 5,023,904 to Kaplan. A special number for dial ordering is made available by the telecommunications provider. The system checks the subscription status of callers, that place orders by dialing-in product codes, by looking up the ANI. The patent does not describe sharing of credit information.

The prior art solutions discussed above suffer from several drawbacks. For example, the capability for supplying the number of the calling party, a feature called automatic number identification (ANI), is not available in all areas. The availability depends on whether the LEC provides this information. Another problem for service providers results when surcharges are applied to certain calls. For example, calls in which a calling card is used to pay for the call require operator-assistance. Service providers, to insure fees to a given customer are aligned with the service provided, will attach a surcharge to such calls because they are more expensive to handle. Frequently, such surcharges cause confusion resulting in inquiry calls to the toll network company or the service provider and loss of customer goodwill. Also, operator-assisted calls cost more to handle than direct calls.

In some areas where ANI data is not available, there is no way (outside of going to a collection agency) to force a calling party to pay for 900 calls if the caller simply denies making the call. The customer's service cannot be turned off for non-payment. Such areas can be identified, for example, by a particular "problem" LEC. One solution is to have the toll network cut such LECs out. But this leads to revenue losses because paying customers are eliminated along with the problem non-paying customers. In addition, it is hard in the first instance even to identify such problem LECs. One way for a sponsor to set up a 900 number service is to have the toll network company pay the sponsor for calls before the toll network company actually receives payment from customers. In situations where the payments are never received, the toll network company must provide the sponsor with detailed information (ANI, call detail, length of call, etc.) relating uncollected receivables and collect the overpayment from the sponsor.

SUMMARY OF THE INVENTION

A telecommunications toll network system employs a central database computer to provide routing and calling rate instructions to toll switches. To allow sponsors of pay services, such as 900 number information services, to control the kinds of calls they receive and the rates charged, the central database computer employs routing plans. These routing plans contain conditional branches which are selected based on data provided in an initial query from the originating toll switch (OTS) and sent to the database computer via common channel signaling (CCS). The data transmitted in the query contains the caller's number (automatic number identification or ANI), if available (or at least the identity of the local exchange company, LEC, or area code from which the call originated). According to the invention, sponsors can insert objects in their routing plans to override the default rate to be applied to the call. These objects are called rate nodes. In addition sponsors can insert logical branches called test nodes that determine the routing of the call in response to data supplied in the query. Both the rate nodes and the test nodes allow sponsors to control rating and routing of calls without having to obtain instructions from the service provider such as by setting up communications (e.g., ISDN lines) between the toll company (either the toll switch or a central computer such as the database computer discussed above) and the service provider as in the prior art. Also, since the routes and applicable rates are determined by a program in response to a single query from the OTS, the call is handled quickly. Moreover, smaller service providers without the ability to set up communications between their own facility (which might be simply a plain old telephone system (POTS) are able to make use of the control features provided.

According to an embodiment, the invention is a telecommunications toll switch system connecting callers with called service sponsors. The system employs a shared database computer connected to the toll switches. The shared database computer has a database that stores routing plans defining various routes connecting the callers to the service sponsors. The database computer is programmed to return instructions to the toll switches in response to a query from the toll switches. The query is generated by the toll switches in response to a call from one of the callers to the service sponsors. The query indicates information about the caller. The instructions indicate a specific route for the call to be implemented by the toll switch in response to the instructions. The routing plan defines alternative routes from which the specific route is selected by the database computer in response to the routing plan and the information. The alternative routes have a corresponding override rate element which determines a rate to be applied to the call. The rate element is a data object that forces selection of a rate through selection of the specific route. Thus, determining the route is effective to determine the rate to be applied to the call.

According to another embodiment, the invention is a telecommunications toll switch system connecting callers with called service sponsors. A shared database computer is employed by at least some of the toll switches in a network. The shared database computer has a database storing routing plans corresponding to the service sponsors. A billing recorder is connected to the originating toll switch. The billing recorder records a duration of each call and a rate to be applied to the call on a billing record. The routing plans define a specific route to be implemented by the originating toll switch when a call is received by the originating switch. The specific route is one of at least two alternative routes. The alternative routes possibly end at the same destination. The alternative routes are modifiable by a support system computer connected to the database computer through a program running on the support system. The program is addressable through various means including: telephone prompting, communication through direct modem connection via a terminal, and connection through the Internet. The alternative routes are defined by a conditional branch point from which stem two alternate branches. Each branch corresponds to one of the alternative routes. The specific route corresponds to the branch that is connected to an outcome of the conditional branch point that satisfies a condition of the conditional branch point. At least one of the alternate branches has an object, called a rate node, that forces the rate to be applied to the call to be overridden when that branch is connected to the outcome. Thus, the billing recorder records an override rate on the billing record when the condition is satisfied.

According to still another embodiment, the invention is a toll switch, with a controller programmed to generate a query in response to reception of a call. The controller has a communications port connectable to a central database computer shared by the toll switch with other toll switches. The controller is further programmed to transmit the query to the central database computer. The query contains data determinative of a routing of the call. The controller is further programmed to receive instructions from the central database computer relating to a specified route to be followed by the call. The controller is further programmed to receive rate data responsively to a generation of the query and responsively to reception of the instructions. The rate data indicates a rate to be applied to the call.

According to still another embodiment, the invention is a method for controlling a toll switch, comprising the steps of: generating a query, containing data determinative of a routing of a call, in response to reception of the call transmitting the query to a database computer receiving instructions from the database computer relating to a specified route to be followed by the call receiving rate data from the database computer responsively to a generation of the query and responsively to reception of the instructions, the rate data indicating a rate to be applied to the call.

According to still another embodiment, the invention is a method for controlling a computer for controlling a plurality of telecommunications switches, comprising: storing, on the computer, routes through which the call may be routed to a final termination, the selected route is one of the routes, the selected route is selected from among the routes responsively to a condition satisfiable by call data relating to the call receiving at the computer call data defining an origination route of a call to the plurality of telecommunications switches determining a selected route responsively to the condition and the call data the step of determining is effective to determine an override rate applicable to the call; and transmitting the selected route to the telecommunications switch.

According to a feature of an embodiment of the invention, rate nodes are non-branching elements inserted in a routing plan that specify a rate to be used for billing. The rate is specified on the automated message accounting (AMA) record and used by a billing platform to generate bills to the callers. For example, a zero-rate node could be used on a time-of-day branch of a routing plan to make off-peak calls to an information service free.

According to another feature of an embodiment of the invention, test nodes are branching elements inserted in routing plans. Test nodes define branches in the routing plan which are responsive to data such as the ANI or called number. For example, a test node with one branch for calls originating from an operator and another branch for other calls, can have an enhanced rate (implemented by means of a rate node on the positive branch stemming from the test node) applied to calls from an operator. For another example, a test node testing for a call from a LEC that does not supply ANI data can cause calls from no-ANI LECs to be routed to an operator or call prompter facility to obtain additional data from the caller to assess and respond to the credit profile of the caller. The latter allows a call from a no-ANI area to be handled in a way that reduces risk from no-ANI callers, which are the source of a great deal of uncollectible receivables assumed by pay calling service providers. It also allows the sponsor to handle a call that would ordinarily be blocked.

DETAILED DESCRIPTION

Figure 1:
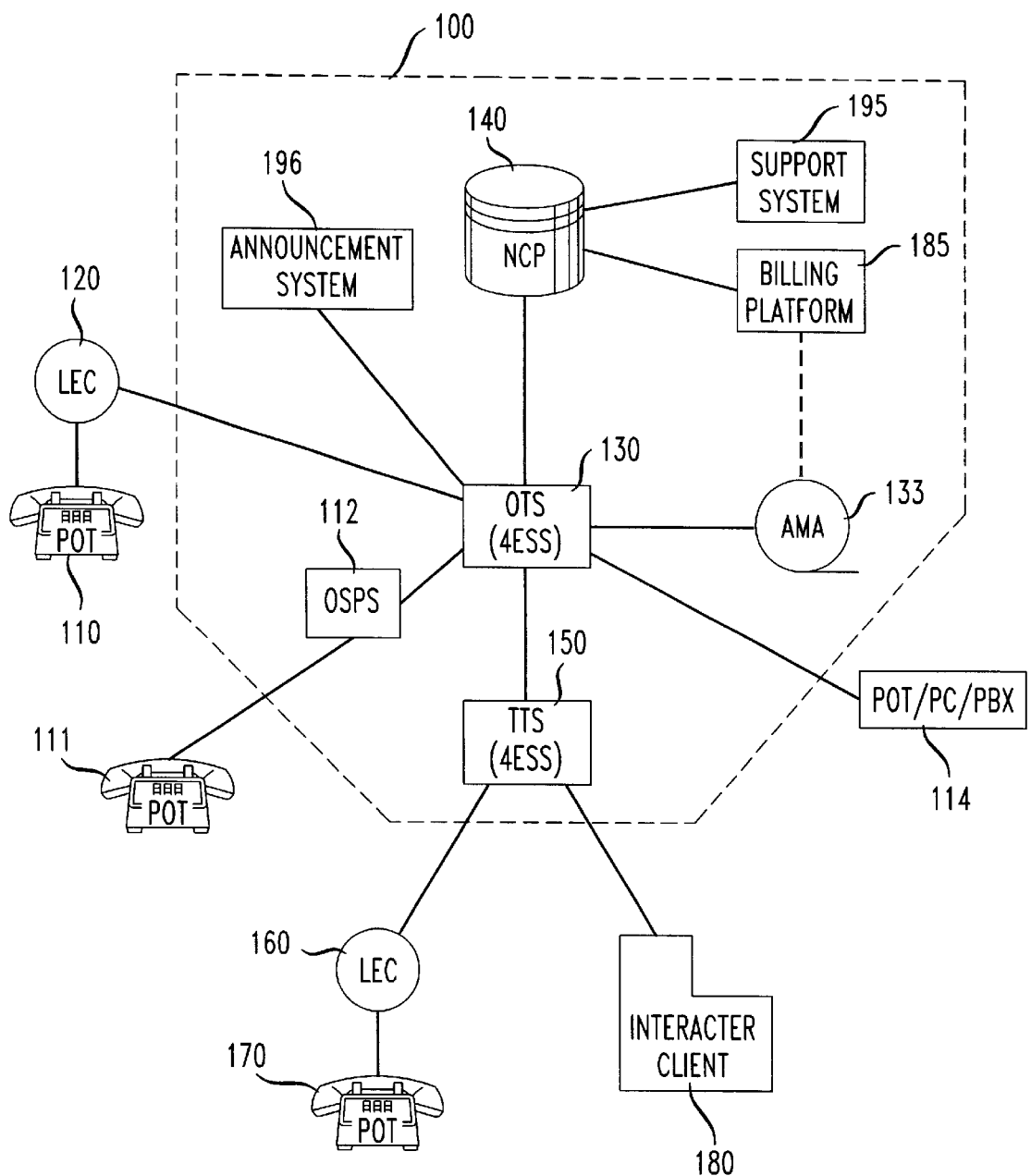
FIG. 1 shows a typical overall block diagram of a pay service call through a toll network showing a call progressing through a local exchange carrier (LEC) to a first or originating toll switch having access to a shared database.

Referring to FIG. 1, a toll-network system shown generally at 100 connects a calling party with a called service provider. A calling party initiates a call through a calling plain old telephone (POT) 110, and is connected through a local exchange carrier (LEC) 120, to an originating toll switch (OTS) 130, in the present embodiment, a Lucent Technologies' #4 Electronic Switching System (#4ESS). Alternatively, POT 111 is connected to OTS 130 with operator assistance via operator assist platform 112. Also shown connected to OTS 130 is a calling POT or computer (PC) or PBX or some other kind of calling station directly connected to OTS 130 without the need for access through a an originating LEC. OTS 130 is in communication with a database computer called a network control point (NCP) 140. OTS 130 is connected to a terminating toll switch TTS 150, in the present embodiment, also a #4ESS. TTS 150 routes the call from OTS 130 to a terminating LEC 160 which connects the call to a called POT 170 of an information provider or other pay-for-call service.

Also connected to TTS 150 is an interacter client (IC) 180 which is a service type of information provider or sponsor that is connected directly to TTS 150. Interacter client 180 is capable of retrieving specialized data from TTS 150 and Calling POT 110 may be a computer, cell phone, a private branch exchange (PBX), other customer premises or off-premises equipment, a personal computer connecting to the public network through the Internet, or some other telecommunications device. Called POT 170 is a pay-for-call service such as a 900 number service. The LECs may be one or more end offices or tandem offices that establish local area connections.

Alternatively, in other embodiments, the calling party is connected directly to the OTS. Also, although only two toll switches, OTS 130 and TTS 150, are shown in a real network, many toll switches may be involved in making the connection between OTS 130 and TTS 150. These toll switches may be interconnected by fiber optic channels (not shown), satellite, radio, or other communication systems.

Note that not shown in FIG. 1 are signal transfer point (STP) centers that provide for connections and may or may not be the points through which the control signal passes. STP connections are involved in communications between OTS 130 and NCP 140 and between OTS 130 and TTS 150.

NCP 140 may be connected to many toll switches other than OTS 130, as shown. NCP 140 is a shared system that contains a computer, a memory, and mass storage for data that includes: telephone numbers and credit card numbers correlated with other data to permit various responses by OTS 130, to be described below. NCP 140 is connected to a support system 195, either a separate computer that communicates with NCP 140 or functionality within NCP 140 that allows certain syntheses of data contained by NCP 140 to be made and communicated to OTS 130. OTS 130, identifying the 900 or other special number being called, transmits an initial query containing the called number, the ANI (or originating NPA is sent if the ANI is not available) and, possibly, other data. NCP 140 responds by looking in the stored data, making calculations based on sponsor-defined algorithms, and replies with billing and routing information OTS 130 will use for billing and routing the call. The latter features are discussed in more detail below.

OTS 130 is also connected to an AMA recording unit 133 which records the duration of calls and other data for billing purposes. OTS 130 is capable of blocking calls in response to special routing instructions from NCP 140.

Connected to support system 195 is a billing platform 185. Billing platform 185 is a separate computer that communicates with support system 195. Billing platform 185 calculates bills to the customer making the call from automatic message accounting (AMA) record generated by AMA recorder 133 connected to OTS 130 and from billing data from originating LEC 120. Note that the AMA record contains call billing information from NCP 140 including special rates from support system 195.

Support system 195 is either a separate computer or functionality programmed in NCP 140. Support system 195 generates code in response to user input which code is implemented by NCP 140. The user interacting with support system 195 can be either a person working for the toll company on behalf of a sponsor or a sponsor itself. Support system 195 is accessible from remote stations such as telephone modems connected to PCS or a network workstation or from a directly connected termination. Support system 195 provides a user interface to a computer program that generates code that can be run on NCP 140.

An announcement system 196 permits callers to be prompted for and respond to requests for further information such as to enter an account number, PIN, or credit card number etc. Announcement system generates synthetic voice-prompting without the need for an operator.

NCP 140 is a resource shared by many toll switches such as OTS 130 and TTS 150. Preferably more than on NCP device will be employed with redundant information to create a failsafe system. NCP 140 can be updated by sponsors accessing support system 195 either directly, such as via a secure access thorough the Internet, or indirectly by making requests to the toll company which makes the modifications for the sponsor. In this way, credit information required to score callers on their relative credit risk can gradually be compiled on billing platform 185 (accessed through NCP 140) and used to control routing and billing of calls.

Support system 195 is typically a computer that runs human-interface software, a graphic user interface (GUI), that generates a customer application language (CAL) is run and utilized by NCP 140. From the point of view of a user (the provisioner or person, which could be the sponsor, using the GUI), the routing plan (visible through the GUI) provides logical functions such as conditional branching, looping, and parameter tests for implementing decision trees in response to information is about a call. For example, the call information, as discussed above, includes at least the ANI or the NPA, if the ANI is not supplied by the LEC 120. A sponsor may wish to have the call routing sent from NCP 140 to OTS 130 to indicate that the call should be terminated (with an announcement) if there is no ANI available.

Rate Node

Figure 2:
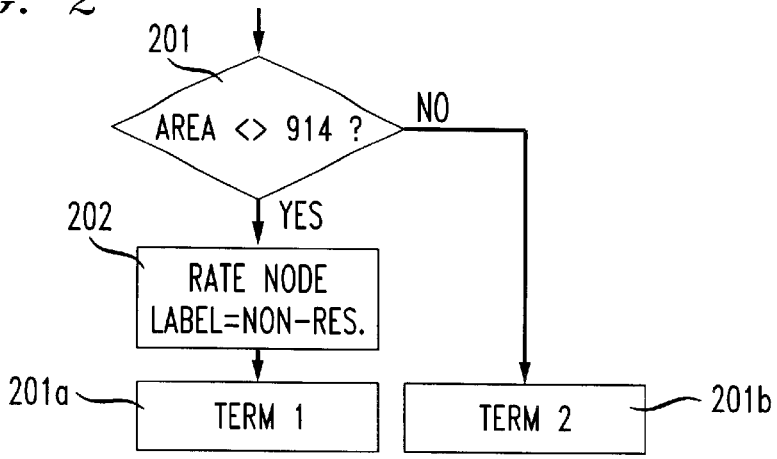
FIG. 2 shows an example of a portion of a routing plan including a rate node according to a first embodiment of the invention.
Figure 3:
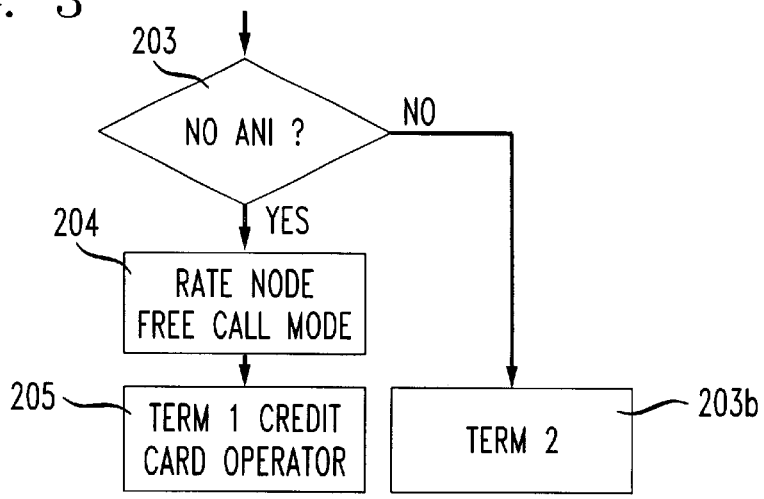
FIG. 3 shows an example of a portion of a routing plan including a rate node according to a second embodiment of the invention.
Figure 4:
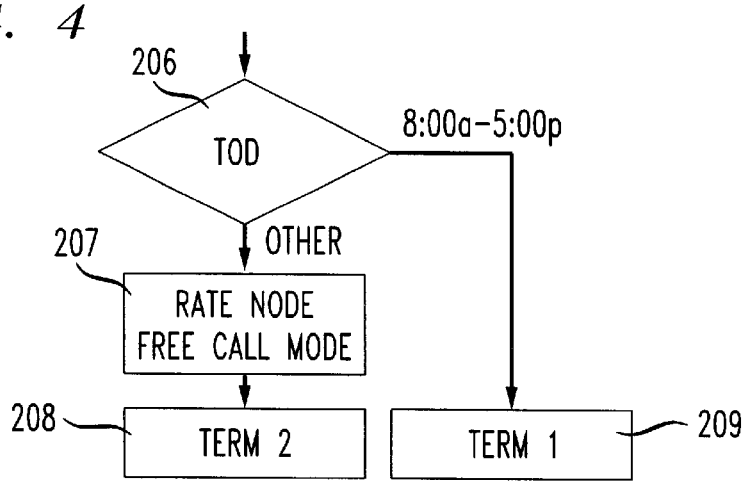
FIG. 4 shows an example of a portion of a routing plan including a rate node according to a third embodiment of the invention.

Referring to FIGS. 2, 3 and 4 examples of portions of a call routing plan for purposes of describing features and examples of application of the invention is shown. In a plan portion, a call may be routed to either a first (Term 1 201*a*) or a second (Term 2 201*b*) termination. The terminations shown and discussed are arbitrary and identified for purposes of describing the rate nodes. In FIG. 2, a geographic routing decision is made at 201 and a rate node 202 placed in the path of one outcome to apply a specified rate to the corresponding path. In the example of FIG. 2, the area code of the ANI is tested to determine if the call is from area code 914. If the call is from 914 the call is routed to termination 2 and if it is not, it is routed to termination 1. Along the termination 1-route is a rate node 202 that applies a rate for non-residences. Such a rate node application could be used for example to charge out-of-state callers a higher fee for information about a state lottery.

In FIG. 3, a test node 203 (described in more detail below) is used to determine whether the call is from a no-ANI LEC and if so, the call is zero-rated (no charge) by a zero-rate node 204 and then the call is routed to an operator 205 to obtain alternate form of credit. Note that additional credit information, such as a credit card number and expiration date, could be obtained through a prompter into which the caller enters digits on the numeric keypad of the calling phone.

In FIG. 4, at 206, the time of day determines the routing of the call to termination 1 209 if the time of the call is between 8:00AM and 5:00PM or termination 2 208 if the call is made at some other time. Along the termination 2 branch, a rate node 207 zero rates the call so that no charge is made. Other examples of rate node implementations are: Override-Rate-for-Defaults—A default branch in a decision tree determining routing of a call could have a different rate applied from that for a main branch of the decision tree. Multiple-Rate-Prompting—One type of decision-making branch implemented on NCP 140 is called a call-prompter node. This type of node is used to make decisions as to the routing of the call based on caller-entered digits. This node prompts the user, using announcement system 196 to prompt the user for voice or keyed commands. A rate node can be inserted along any branch defined by a call-prompter node so that each branch or destination would have a different rate applied to it. For example, a caller could be prompted to indicate the type of product for which he requires information and then identify the class of customer that applies (e.g., business, home, educational). Each destination could have a different rate applied to it.

Test Node

Figure 5:
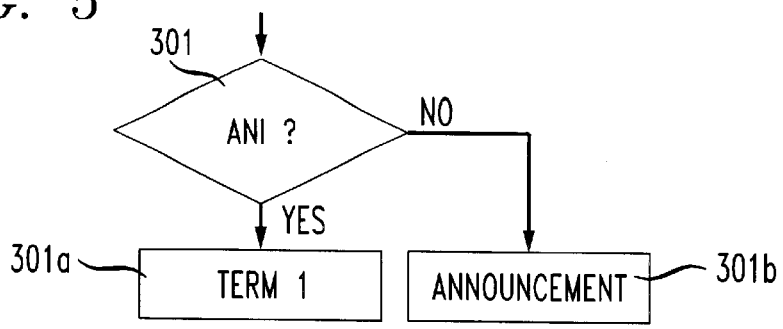
FIG. 5 shows an example of a portion of a routing plan including a test node according to a fourth embodiment of the invention.
Figure 6:
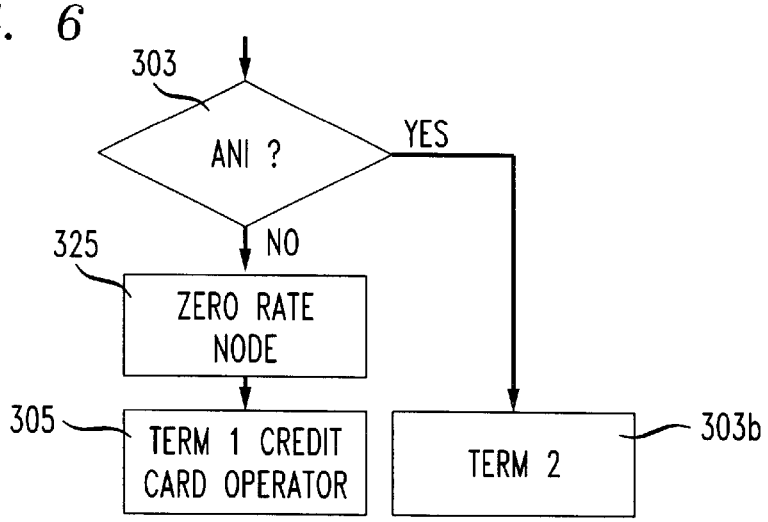
FIG. 6 shows an example of a portion of a routing plan including a test node according to a fifth embodiment of the invention.
Figure 7:
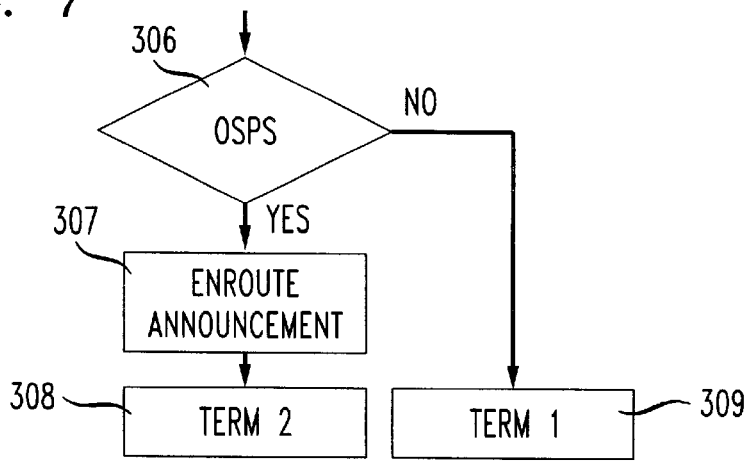
FIG. 7 shows an example of a portion of a routing plan including a test node according to a sixth embodiment of the invention.

Referring to FIGS. 5, 6, and 7, examples of test nodes are shown. In a related application entitled Method and Apparatus for Controlling Routing of Calls to Pay Services, the entirety of which is incorporated herein by reference, the test node device for routing calls (routing here can mean a purely symbolic logical device so that a call may have alternative routes but still connected to the same destination), is described. A test node is an element in a call routing plan that tests for some parameter of the calling party or some other feature of the call and makes a routing decision based on the result. For example, in FIG. 5, a test node 301 tests the ANI field of the calling party to determine if the ANI is provided. If no ANI is supplied, the call is terminated with an announcement. If an ANI is supplied, the call is routed to a termination associated with the provider's service. In this example, the service provider has chosen to eliminate calls from no-ANI callers, which is useful to avoid the credit risk of such calls. In FIG. 6, an ANI test node 303 is used to route the call to an operator 305 to obtain additional credit information on the caller. The route including the operator also includes a zero-rate node 325 which zeros out the call rate to the operator so the caller is not charged twice (since the caller is paying for the call with his credit card). In this case, for example, the credit-card operator would obtain information to allow the service provider to bill the caller's credit card instead of relying on the toll company which may or may not be able to collect since the caller's ANI is not known. In FIG. 7, an OSPS test node 306 checks to determine if the call was made with operator assistance, as for example a call from originating POTS 111 through operator assist platform 112. In the example of FIG. 7, the call is routed appropriately and an announcement provided to indicate to the caller that a surcharge will be applied to the call. Another type of test node determines whether a call originated from a cell phone. Different routing could be applied when a call originates from a cell phone. For example, cell calls could be handled more expeditiously in exchange for a surcharge which could be implemented with a test node in connection with a rate node.

Note that in the above examples, although multiple terminations are shown, there is no reason that the termination could not be the same. Thus the branch for example in FIG. 7 might be just for the purpose of providing the announcement or the branching in FIG. 2 might be just for application of the different rates.

The following describes the course of a call made according to the invention with reference to FIG. 1.

1. A caller dials a number, for example, a pay-for-information number 1-900-NXX-XXXX.

2. Originating LEC 120 recognizes the number as one for the toll company providing 900 service to sponsors. Originating LEC 120 then routes the call to OTS 130.

3. OTS 130 receives the called number and ANI from LEC 120, generates a query containing this information, and sends the query to NCP 140.

4. NCP 140 looks up the called telephone number to determine the corresponding routing plan to implement. The routing plan contains test nodes and/or rate nodes. NCP implements the plan to generate instructions for the routing and rating of the call.

5. NCP 140 transmits a message that indicates the appropriate routing and rating information back to OTS 130. This information could instruct OTS 130 to simply complete the call to the ultimate destination or to do something, such as prompt the caller to enter further information and respond to NCP 140 with the results.

6. OTS 130 sends a message to TTS 150 indicating the destination of the call.

7. The call terminates at the sponsor's site 180.

8. TTS 150 indicates to OTS 130 that the call has been picked up ("answer supervision").

9. OTS 130 begins recording the AMA record using information, including an index value corresponding to a rate to be applied, which information is supplied earlier from NCP 140. Note that the rate information could be supplied directly (dollars and cents) rather than through an index value and recorded on the AMA record.

10. The AMA record is supplied to billing platform 185. EMI data containing billing data from the LEC is also supplied to the billing platform if the call is a no-ANI call)

11. Billing platform 185 derives the special rating information from the AMA record and applies it to prepare a bill.

Figure 8:
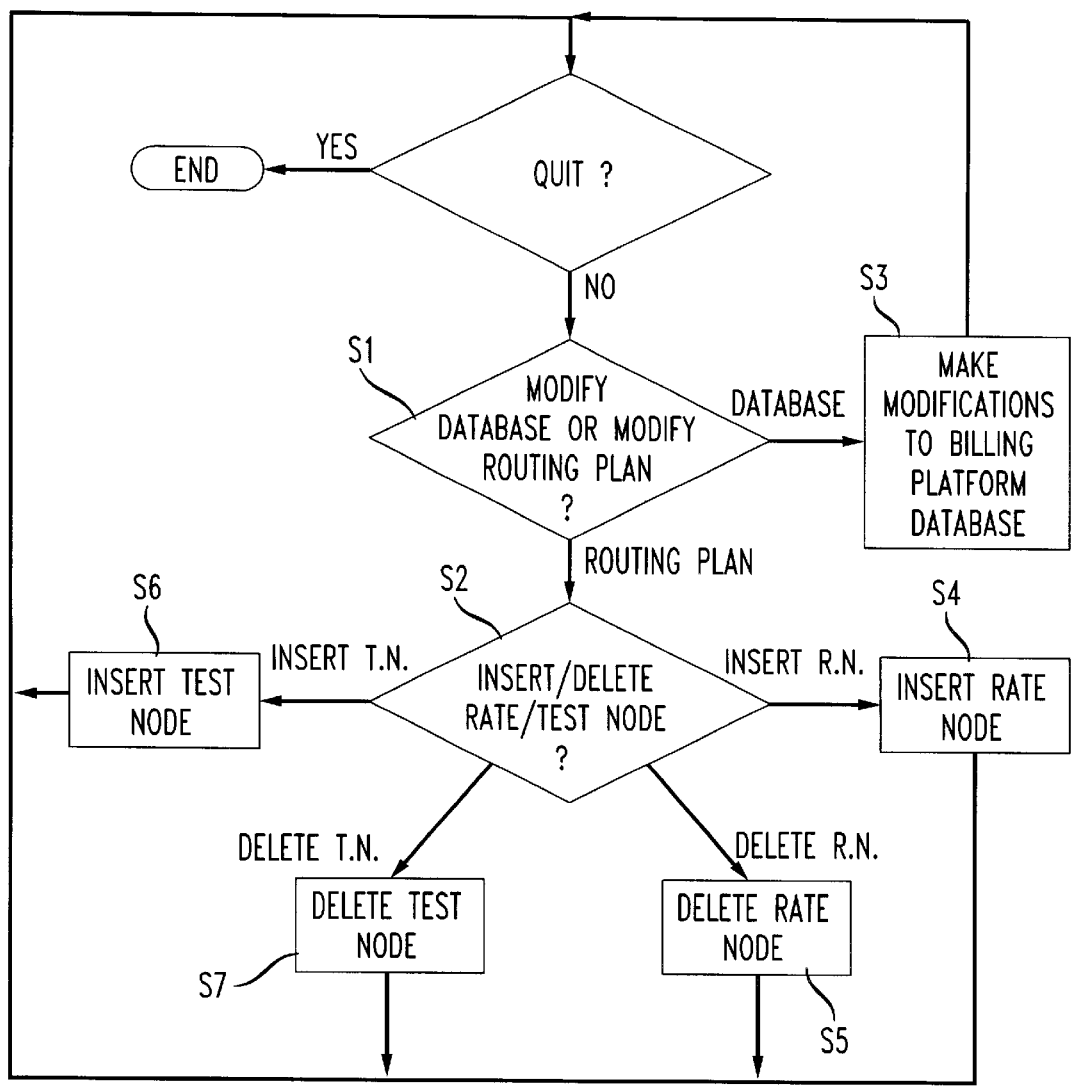
FIG. 8 shows a flow chart representing a method of allowing a sponsor to insert rate and/or test nodes into a routing plan.

Referring to FIG. 8, the following describes the logic of the GUI used to define routing plans and credit-risk database ultimately used by NCP 140 and billing platform 185. At S1, the user (the sponsor itself or a toll-company employee running the GUI on the sponsor's behalf) is prompted to indicate whether a modification of the routing/rating plan or caller database is desired. At S2, if the user wishes to modify the routing/rating plan, the user is prompted to indicate whether the insertion or deletion of a rate node or insertion or deletion of a test node is desired. At S3, in response to an indication at step S1 that the user wishes to modify the caller database, the GUI executes a routine to allow the making of modifications to the database defining customer risk correlated with ANIs. At S4, if the user indicated that a rate node was to be inserted, the user is prompted with a list of routing branches to which a rate node can be applied. The user selects from the list, is prompted to select the type of rate and the amount if applicable and the rate node is added. At step S5, if the user indicated that a rate node was to be deleted, the user is prompted with a list of existing rate nodes showing the type of rates with the corresponding routing branches. The user selects the rate to be deleted. At step S6, if the user indicated that a test node was to be inserted, the user is prompted with a list of routing branches to which a test node can be applied. The user selects a branch and is prompted to select from a list of types of test nodes and the test node is added. Then the user is prompted to indicate the termination for the new branch of the test node. At step S7, if the user indicated that a test node was to be deleted, the user is prompted with a list of existing test nodes showing the type of test nodes. The user selects the test node to be deleted and the test node is deleted.

Note that, ideally, the GUI interface follows the format of a flow chart. Thus, FIGS. 2–7 represent the kinds of graphical objects that are preferably used in the GUI to allow updates to be made to the routing plans. Thus, in a preferred embodiment, the GUI projects flow charts onto a computer screen allowing the flow-chart elements to be manipulated, moved, deleted, modified, selected, and so as well known in the programming field to form, modify, or eliminate various features of the routing plans.

Figure 9:
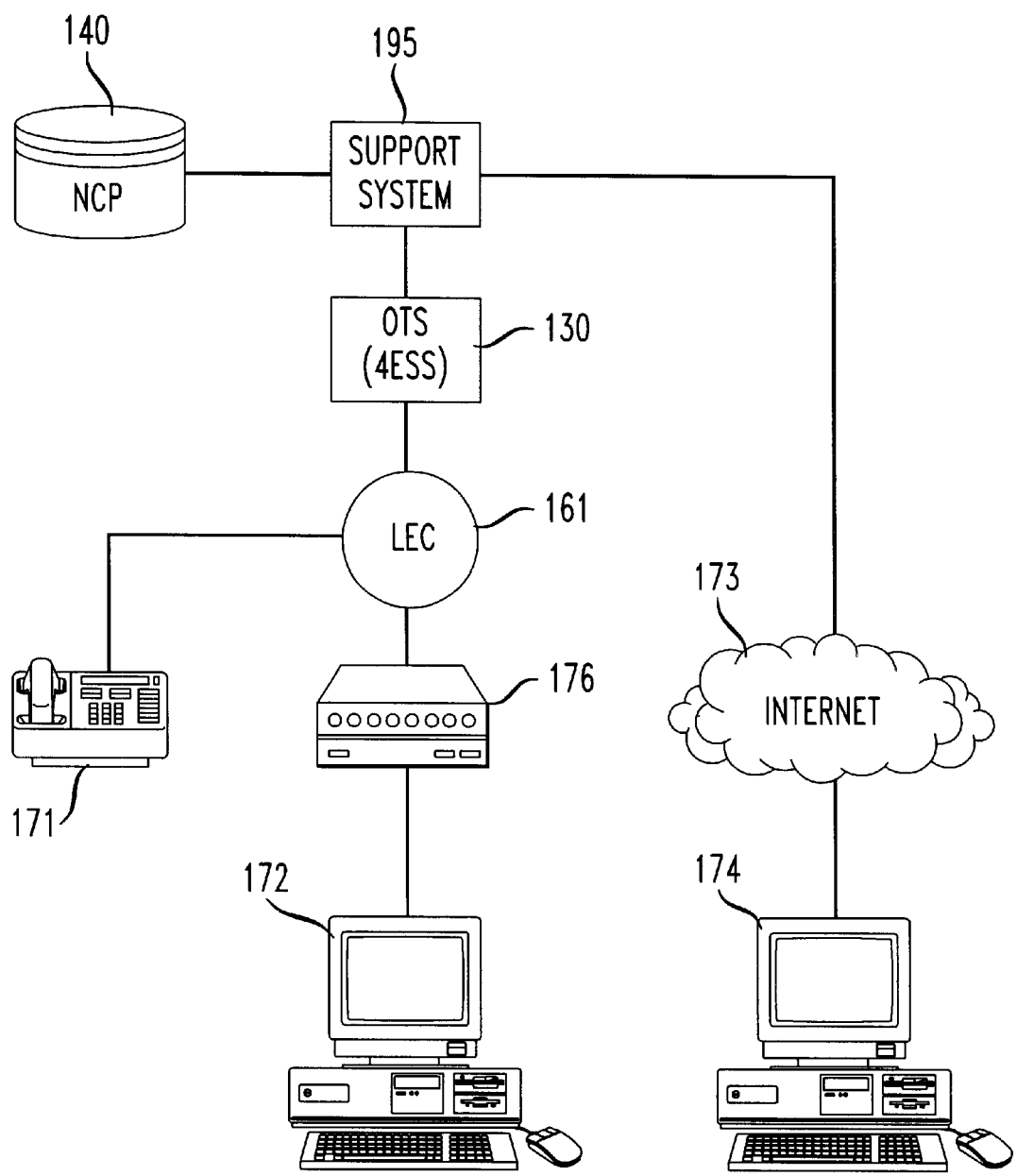
FIG. 9 shows a block diagram of devices for updating a routing plan stored on a database computer (NCP) by inserting, deleting, and modifying rate and test nodes through a support system computer.

Referring to FIG. 9, note that the modifications to the routing plans stored in NCP 140 are implemented by means of a GUI running on support system computer 195. The support system 195 can be accessed by a sponsor through various means such as through touch-tone commands and voice prompting using a telephone 171. This allows even small sponsors to make customized call routing plans. Alternatively, the GUI can be accessed by means of a secure Internet connection 173 through a termination 174. Still another means of accessing the GUI is through a direct dial-up service using a modem. 176 and a PC 172.

Note that a menu of predefined routing plans could be stored on support system 195 which would make updating of routing plans more amenable to voice-prompting through telephone 171 as well as the other methods described with reference to FIG. 9. Predefined plans could be defined by the toll company as recommended plans or defined by the sponsor and stored for later selective implementation. Such a scenario would be more amenable to voice-prompting.

What is claimed is:

1. A telecommunications toll switch system connecting callers with called pay service sponsors, wherein said pay service sponsors comprise one of a pay for information or a pay for product service, comprising:

toll switches forming a network of a toll network company preselected by said pay service sponsors;

a shared database computer connected to at least one of said toll switches, said shared database computer having a database storing routing plans and rate plans corresponding to at least one pay service sponsor;

said routing plans defining alternative routes from which a specific route is selected by said database computer based on caller information and a plurality of pay service sponsor defined conditional logical branches, said specific route being one of at least two alternative routes possibly ending at the same destination;

said rate plans defining alternative rate plans from which a specific rate is selected by said database computer in accordance with caller call information and a plurality of pay service sponsor defined conditional override rate nodes;

said database computer being programmed to return instructions to at least one of said toll switches in response to a query from at least one toll switch, said query generated by said at least one toll switch in response to caller call information to the pay service sponsor, the query comprising information about said call; and said returned instructions comprising the specific route and corresponding specific rate for said call to be implemented by said at least one toll switch, said selected specific route and rate corresponding to the called pay service sponsor.

2. A system as in claim 1, further comprising a support system computer connected to said database computer and programmed to be responsive to input by one of said pay service sponsors, to modify said routing, plans and rate plans by inserting and deleting the plurality of pay service sponsor defined conditional override rate nodes and logical branches.

3. A system as in claim 1, further comprising a recording device to record information about said call, said recording device being connected to said at least one of said toll switches, data defining a rate being written to a record by said recording device in response to said the plurality of pay service sponsor defined override conditional rate nodes.

4. A system as in claim 1, wherein said routing plan is such that said specific route is a first route when said information includes an indication that said call was operator-assisted.

5. A system as in claim 1, further comprising:
an announcement system connected to said at least one of said toll switches, said announcement system having a recording indicating that a specified rate is to be applied to said call in accordance with said stored rating plan predetermined by said called pay service sponsor;
said routing plan being such that said specific route is a first route when said information includes an indication that said call was operator-assisted;
said first route being such that said announcement system is controlled to play said recording when said specific route is said first route.

6. A system as in claim 1, wherein said routing plan is such that said specific route is a second route when said information includes an indication that said call originated from a cellular phone.

7. A system as in claim 1, wherein said routing plan is such that said specific route is a third route when said information lacks an identification of the caller.

8. A telecommunication toll switch system connecting callers with called service sponsors, comprising:
toll switches forming a network;
a shared database computer connected to at least one of said toll switches, said shared database computer having a database storing routing plans and rate plans corresponding to at least one pay service sponsor;
said routing plans defining alternative routes from which a specific route is selected by said database computer based on caller information and a plurality of pay service sponsor defined conditional logical branches, said specific route being one of at least two alternative routes possibly ending at the same destination; and
said rate plans defining alternative rate plans from which a specific rate is selected by said database computer in accordance with caller information and a plurality of pay service sponsor defined conditional override rate nodes;
said database computer being programmed to return instructions to at least one of said toll switches in response to a query from at least one toll switch, said query generated by said at least one toll switch in response to caller call information to the pay service sponsor, the query comprising information about said call;
said returned instructions comprising the specific route and corresponding specific rate for said call to be implemented by said at least one toll switch, said selected specific route and rate corresponding to the called pay service sponsor;
an announcement system connected to at least one toll switch, said announcement system having a recording indicating that a specified rate is to be applied to said call;
said routing plan being such that said specific route is an alternate route when said information lacks an identification of the caller; and
said alternate route being such that said announcement system is controlled to play said recording when said specific route is said alternate route.

9. A system as in claim 1, wherein:
said routing plan is such that said specific route is a third route when said information lacks an identification of the caller; and
said third route includes an operator for obtaining credit information from said one of said callers.

10. A system as in claim 1, wherein said routing plan is such that said specific route is a fourth route when said information includes an indication that said call originated from one of a specified LEC and a specified area code.

11. A system as in claim 9, further comprising a support system computer connected to said database computer and programmed to update said routing plans in response to input data directly entered by said pay service sponsors.

12. A system as in claim 1, further comprising a support system computer connected to said database computer and programmed to update said routing plans in response to input data directly entered by said pay service sponsors.

13. A telecommunications toll switch system connecting callers with called service sponsors, comprising:
toll switches forming a network;
a shared database computer connected to at least one of said toll switches, said shared database computer having a database storing routing plans corresponding to at least one of said service sponsors;
a billing recorder connected to said toll switch, said billing recorder recording a duration of a call and a rate to be applied to said call on a billing record;
said routing plans defining a specific route to be implemented by an originating toll switch of said toll switches when a call is received by said originating switch, said specific route being one of at least two alternative routes, said at least two alternative routes possibly ending at the same destination;
said two alternative routes being modifiable by a support system computer connected to said database computer through a program running thereon and addressable through at least one of telephone prompting, communication through direct modem connection via a terminal, and connection through the Internet;
said two alternative routes being defined by a conditional branch point from which stem two alternate branches, each branch corresponding to a one of said two alternative routes, said specific route corresponding to the one of said two alternate branches that is connected to an outcome of said conditional branch point that satisfies a condition of said conditional branch point;
at least one of said two alternate branches having an object, called a rate node, that forces said rate to be applied to said call to be overridden when said at least one of said two alternate branches is connected to said outcome, whereby said billing recorder records an override rate on said billing record when said condition is satisfied.

14. A system as in claim 13, wherein said rate to be applied to said call is defined by said object.

15. A system as in claim 13, wherein said branch point is a test node in which said condition is determined by a parameter of data indicating an origin of said call, said data being communicated to said database computer through a query from said originating toll switch to said shared database computer.

16. A system as in claim 13, wherein:
said branch point is a test node in which said condition is determined by a parameter of data indicating an origin of said call, said data being communicated to said database computer through a query from said originating toll switch to said shared database computer; and said parameter is an indication that said call was operator-assisted.

17. A system as in claim 13, wherein:

said branch point is a test node in which said condition is determined by a parameter of data indicating an origin of said call, said data being communicated to said database computer through a query from said originating toll switch to said shared database computer; and said parameter is an indication that said call originated from a cellular phone.

18. A system as in claim 13, wherein:

said branch point is a test node in which said condition is determined by a parameter of data indicating an origin of said call, said data being communicated to said database computer through a query from said originating toll switch to said shared database computer; and said parameter is ANI data.

* * * * *